Dec. 29, 1942.   J. T. VAUGHAN   2,306,837
ELECTRICAL CONTROL SYSTEM
Filed March 14, 1941   4 Sheets-Sheet 1

INVENTOR
JOHN T. VAUGHAN
BY John H. Leonard Jr.
Harold J. Rathbun,
HIS   ATTORNEYS

FIG.3

Dec. 29, 1942.    J. T. VAUGHAN    2,306,837
ELECTRICAL CONTROL SYSTEM
Filed March 14, 1941    4 Sheets-Sheet 3

FIG.4

JOHN T. VAUGHAN
BY John H. [illegible]
Harold J. Rathbun
HIS ATTORNEYS

Dec. 29, 1942.  J. T. VAUGHAN  2,306,837
ELECTRICAL CONTROL SYSTEM
Filed March 14, 1941  4 Sheets-Sheet 4

INVENTOR
JOHN T. VAUGHAN
BY John A. Kronov &
Harold J. Rathbun,
HIS ATTORNEYS

Patented Dec. 29, 1942

2,306,837

UNITED STATES PATENT OFFICE 2,306,837

ELECTRICAL CONTROL SYSTEM

John T. Vaughan, Shaker Heights, Ohio, assignor to The Electric Controller & Manufacturing Company, Cleveland, Ohio, a corporation of Ohio Application March 14, 1941, Serial No. 383,383

17 Claims. (Cl. 172—288)

This invention relates to a control system for an electric translating device, the illustrative examples hereinafter disclosed being improved control systems for automatically short circuiting the starting impedance in either direct current or alternating current motor circuits during acceleration of the motor and for introducing a time delay between the closing of successive starting switches, the extent of the time delay intervals being influenced by the load on the motor during acceleration. Embodiments of the invention in connection with other translating devices are apparent from the illustrative examples and are not specifically described.

Heretofore, in the control of translating devices by timing circuits, timing circuits similar to that hereinafter described have been provided, but the prior timing circuits either have been operatively connected to the translating devices in a manner such that the timing intervals thereof were inversely related to the magnitude of the particular electrical condition of the translating device on which the timing circuit depended for its energization, or were connected so that the timing intervals were directly related to the magnitude of the particular electrical condition, in which case they were particularly adapted for use with alternating current motors or had other disadvantages and limitations.

Such prior timing circuits are set forth and described in United States Letters Patent No. 2,024,019, issued December 10, 1935, to David C. Wright, and in the copending patent application of William J. Kutcher and John D. Leitch, which issued as Patent No. 2,247,506 on July 1, 1941. The timing circuit employed in the Wright patent is for a resistance welder and provides a time interval which is inversely related to the magnitude of the current flowing through the welding electrodes. A timing circuit similar to that of the Wright patent is employed in the Kutcher and Leitch application, but it is connected so as to provide timing intervals which are directly related to the amount of current flowing to an electric translating device and particularly to an alternating current device.

The timing control circuit of the present invention provides timing intervals which are directly related to the amount of current flowing to an electric translating device, as in the Kutcher and Leitch application, but is modified by the addition of certain elements and new cooperative relations of the component parts with each other and with the translating device, and consequently possesses numerous advantages over the timing control circuit therein disclosed. Among these advantages are a greater effect on the time interval for a given change in current when used with direct current motors, greater adjustability of the time-current relation, a capability of operating under varying voltage relationships instead of requiring a predetermined relationship of voltage values, forced acceleration at all times, substantially a direct proportional relationship between the motor load and the extent of the time interval, and automatic reduction of the time intervals as the motor accelerates.

Various other means have heretofore been used for automatically and successively short circuiting portions of an accelerating impedance in a motor circuit so that the starting current of the motor would not exceed certain predetermined values. Such of these systems as provide a definite time delay between the successive closing of the impedance shunting switches do not have the above advantages but instead certain disadvantages, in that, if the time delay periods are adjusted for an intermediate load, the periods are too long for lighter loads and too short for heavier loads. As one example, a motor driving a definite mechanical load, such as a fan, accelerates at a rate which is dependent upon the frictional resistance as well as upon the total inertia of the load. The frictional resistance varies greatly with the temperature so that often during cold weather the acceleration contactors close too quickly if the acceleration time is definitely predetermined. As another example, a motor may be used to drive a wide range of loads varying from twice full load to extremely light loads, and, if the acceleration time is set so that excessive current peaks are prevented from occurring under heavy loads, then, on light loads, the motor is accelerated at a much lower rate than is economically or otherwise desirable.

In order to overcome such disadvantages in the case of direct current motors, numerous systems have been developed for automatically excluding starting resistance at a rate dependent upon the electrical condition of a motor circuit during the accelerating period. Two of the more common of such systems are known as counter-electromotive-force acceleration and current limit acceleration. One of the disadvantages common to both of these systems is that they cannot start or accelerate a stalled or too heavily loaded motor since under such conditions the counter-electromotive force either does not exist or does not increase. In the case of current limit acceleration the current does not decrease sufficiently to cause relay operation unless the motor rotates at an appreciable speed. Various means have been used to eliminate these defects, and such improved systems are known as combined time limit and current limit. All of such improved systems, however, are primarily adapted to determine only short time intervals, generally are not readily adjustable for different load conditions, require the use of an accelerating relay for each step of acceleration, or are incapable of providing time delay intervals directly proportional to the motor load.

One or two minutes may be required to bring a motor driving a heavy inertia load up to full speed. This necessitates either the use of many acceleration steps each having a relatively short time interval or the use of fewer steps each having a longer time interval. The use of fewer steps of longer duration is the more economical of the two, but heretofore has not been used to as great an extent as desired in the case of direct current motors because of the difficulty of providing a satisfactory means to determine the long time intervals and still have the time intervals vary in close proportion to the motor load.

The present invention is an automatic motor control system for direct or alternating current motors which is capable of providing long time intervals between the successive operations of the accelerating switches and which time intervals vary in close proportion to the motor load, thus permitting acceleration at a rate dependent upon the motor load during the accelerating period, and which is capable of causing the starting resistance to be shunted, even though the motor is stalled or the amount of motor current is excessive. The present system also is operative in a manner such that the duration of time which may be obtained between the successive operations of the accelerating switches is greater than any known motor requirement, and the time delay intervals may be readily adjusted over this wide range.

Consequently, the present invention has great universality of application, being adaptable for use with any type of motor driving any type of load, even though the motor inherently may require a long acceleration period. The present system also is particularly suitable for the acceleration of small direct current motors since the timing control circuit is much simpler and cheaper than those heretofore used to give time-current control of operation for that type of motor.

Its universality is further illustrated in some embodiments of the invention in which the time interval on each succeeding step is inherently shorter than on the preceding step as long as the motor is accelerating. This shortening of the time interval on successive steps of acceleration is desirable in the case of direct current motors driving a constant torque load where it is necessary that the peak currents during acceleration be kept nearly constant.

An important object of the present invention is to provide a control system capable of providing the advantages above set forth.

A more specific object is to provide an improved system for controlling an electric translating device in accordance with the magnitude of a varying electrical condition of a circuit of the device to be controlled.

Another object is to provide a timing control circuit for an electrical translating device in which the time delay intervals are directly related but in a substantially direct proportional relationship to the magnitude of an electrical condition of the device.

Another important specific object is to provide a system for controlling the operation of an electrical translating device by an operative relation between a condenser and an electrical condition of a circuit of the device such that the charging rate of the condenser is directly proportional to the electrical condition.

An important object of the invention is to provide an improved system of motor acceleration in which a timing control circuit is provided which may be adjusted to provide a suitable acceleration of the motor under normal working conditions, and which, without change of adjustment, controls more effectively the acceleration of the motor under different or changing working conditions or under abnormal working conditions.

Another object is to provide a control system for a direct current motor in which a means responsive to a predetermined potential is connected across an electrical energy absorbing device and capable of changing more effectively the condition of motor operation in relation to the load on the motor.

A correlative object of the present invention is to provide a system of direct current motor control which combines all of the advantages of the definite time delay systems and the current limit systems and which can be adjusted readily to provide a wider range of acceleration periods than heretofore obtained.

Another object is to provide for a motor, a time-current control system which produces a greater effect on the acceleration time interval for a given change in motor current.

Another object is to provide an improved motor control system incorporating a single timing control device which controls a plurality of accelerating switches in response to variations in the value of current in a motor circuit, the time delay intervals between operation of the switches being longer when the current value is larger and being shorter when the current value is smaller.

Another object is to provide a direct current motor control system incorporating a single time delay device which controls a plurality of accelerating switches in response to variations in the value of current in a motor circuit and in which the successive time delay periods are progressively decrescent in extent.

Another object is to provide a readily adjustable time delay means for accomplishing the above objects, yet which has no moving parts other than the movable contacts of a small relay.

Other objects and advantages will become apparent from the following specification, wherein reference is made to the drawings, in which.

In the several figures, like parts are referred to by the same reference numerals.

For purposes of illustration, the invention is disclosed in detail in the drawings and description hereof as applied to a direct current motor of the series type and to an alternating current induction motor.

The invention in one form thereof comprises two condensers connected in series with each other and the combined condensers connected as a unit in parallel with the armature winding and series field winding of a direct current motor. When the motor is first connected to a power source through an accelerating resistance, the condensers charge immediately so that the total voltage drop across the armature and series field of the motor is divided between the condensers in inverse proportion to the capacities of the condensers. Concurrently, a circuit is completed from one terminal of the power source to the condensers through a timing resistor in a manner such that one of the condensers begins to increase its charge toward the voltage of the source while the other condenser begins to decrease its charge. The control condenser, that is, the condenser which is increasing its charge, is shunted by a series connection including a gaseous discharge device and the operating winding of a control relay. After a time interval, the voltage across the control condenser reaches the firing voltage of the gaseous discharge device, and a current thereupon flows through the operating winding of the control relay causing its operation. Operation of the control relay effects energization of the operating winding of an acceleration contactor which thereupon operates to short circuit a portion of the accelerating resistance. Concurrently, the relay operation effects complete discharge of both condensers.

The voltage of the source applied to the control condenser during the time interval is reduced in relation to the magnitude of the voltage drop necessarily occurring across the starting resistance and the resultant is modified by the ratio of the condenser capacities, as more clearly disclosed by the mathematical analysis and structural description hereinafter set forth. The time interval before the control condenser is charged to the breakdown voltage of the discharge device is directly related to the average magnitude of the voltage drop across the starting resistance during the time interval and, since the voltage drop across the starting resistance is inversely proportional to the counter-voltage of the motor, the time interval before breakdown of the discharge device is inversely related to the average magnitude of the counter-voltage. The average magnitude of the counter-voltage during the time interval is substantially inversely proportional to the motor load, and consequently the time interval is directly related to the motor load.

In another form of the invention, a control relay is operated directly by the charging current of the pair of series-connected condensers. When the charge on the control condenser approaches a predetermined value, the charging current has decreased to a predetermined value which permits the control relay to drop out. Drop-out of the control relay effects operation of an accelerating contactor to short circuit impedance in the motor circuit.

When either of the timing control circuits above described is used for controlling an alternating current motor, a potential transformer and rectifier combination supplies a constant unidirectional voltage to the timing control circuit and a current transformer and rectifier combination supplies a varying unidirectional voltage to the timing control circuit. The voltage supplied by the current transformer varies directly in accordance with the motor load and is thus operatively similar to the voltage drop across the starting resistance in the case of direct current motors, and the voltage supplied by the potential transformer is operatively similar to the voltage of the source in the case of direct current motors.

Figure 1:
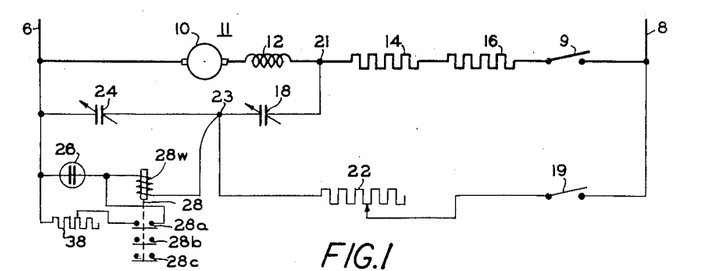
Fig. 1 is a simplified wiring diagram illustrating the timing control circuit of the present invention, and connected with a direct current motor.

In Fig. 1 a direct current motor 11 having an armature winding 10 and a series field winding 12 is arranged to be connected between the conductors 6 and 8 through the series connected acelerating resistors 14 and 16 when a switch 9 is closed. A condenser 18 and a condenser 24 are connected in series with each other and the combined condensers 18 and 24 are connected as a unit in parallel with the armature 10 and the series field 12. One terminal of the condenser 24 is connected to the conductor 6 and one terminal of the condenser 18 is connected between the field winding 12 and the accelerating resistor 14 at a junction point 21. The other terminals of the condensers 18 and 24 are interconnected through a junction point 23. Although the terminal of the condenser 18 is shown connected to the power circuit of the motor 11 at the junction point 21 between the series field 12 and the resistor 14, this connection could be made between the armature 10 and the field 12 or at some other suitable place between the armature and a portion of the series connected accelerating resistance. The condensers may be fixed instead of adjustable.

A switch 19 is arranged to connect an adjustable resistor 22 between the conductor 8 and the interconnection between the condensers 18 and 24 at the junction point 23. The condenser 24 is shunted by a series connection including a gaseous discharge device 26 and an operating winding 28w of a relay 28. The discharge device 26, which may be of any suitable type but which preferably has cold electrodes in an attenuated atmosphere of neon, helium or the like, is shunted by a series connection including an adjustable resistor 38 and the normally-open contacts 28a of the relay 28. The contacts 28a are operable in response to the energization of the operating winding 28w. The relay 28 also has normally-open contacts 28b and 28c which may effect control of the motor 11 as hereinafter described in connection with Fig. 3. The discharge device 26 and the winding 28w might in some cases be preferably connected across the condenser 18 or across both condensers as desired.

If the conductors 6 and 8 are connected to a suitable source of direct current (not shown) and the switches 9 and 19 are closed simultaneously, current flows through the resistors 16 and 14 and the motor 11, causing a voltage drop across the motor 11, which immediately charges the condensers 18 and 24 so that the total voltage across the condensers 18 and 24 is equal to the voltage drop across the motor 11, the two condensers 18 and 24 dividing the total voltage in the inverse ratio of their capacities. Concurrently, a current starts to flow from the conductor 8 through the switch 19 and the resistor 22 to the junction point 23. The current divides at the junction point 23, part flowing through the condenser 18 and the motor 11 to the conductor 6 and part flowing through the condenser 24 to the conductor 6. As a result of the closure of the switch 19, the condenser 24 gradually increases its charge and the condenser 18 gradually decreases its charge to zero and then begins to increase its charge at opposite polarity.

With the connections as shown in Fig. 1, the time interval required for the accumulated voltage across the condenser 24 to reach the discharge voltage of the device 26 is directly related to the magnitude of the average voltage drop across the starting resistors 14 and 16 during the time interval. However, if the condenser 18 and its connections were removed and the condenser 24 left connected as shown in Fig. 1, the time required for the voltage across the condenser 24 to reach the discharge voltage of the device 26 would be inversely related to the magnitude of the voltage between the conductors 6 and 8, would be constant if that voltage were constant, and would be unaffected by the electrical condition of the motor. If the terminal of the condenser 18 which is connected to the junction point 21 in Fig. 1 were connected directly to the conductor 6, the time interval would also be so related and constant and unaffected by the electrical condition of the motor. The addition of the condenser 18 if so connected in parallel with the condenser 24 would merely increase the total capacitance of the timing circuit so that the time delay interval would be increased over the time interval obtained with the condenser 24 alone.

Assume, in the connections of Fig. 1, that closure of the switch 9 impresses the counter-voltage of the motor 11 on the condensers 18 and 24 in a manner such that the right hand terminal of the condenser 18 becomes negative and the left hand terminal of the condenser 24 becomes positive. Closure of the switch 19 impresses the voltage of the source less the voltage drop in the resistor 22 across the condenser 24 so that its left-hand terminal remains positive and current flows through the resistor 22 and the condenser 24 in such a direction as to increase the charge on the condenser 24. The voltage drop across the resistors 14 and 16 is now impressed across the circuit including the resistor 22 and the condenser 18. The polarity of the voltage drop across the resistors 14 and 16 is such as to cause current to flow through the condenser 18 in a direction to decrease the charge on the condenser 18 with respect to its initial charge. The charge on the condenser 18 is consequently reduced at a rate dependent upon the value of the voltage drop across the resistors 14 and 16. After the charge on the condenser 18 reaches zero, the condenser 18 commences to charge at the opposite polarity and its right hand terminal becomes positive. The rate of discharge and recharge of the condenser 18 affects the rate of charge of the condenser 24 so that a longer time is required before operation of the relay 28 than if the condenser 18 were not present. The time required to charge the condenser 24 to the breakdown voltage of the device 26 is therefore a function of the voltage drop across the resistors 14 and 16. Since the counter-voltage of the motor 11 is inversely related to the voltage drop across the resistors 14 and 16, the rate of discharge and recharge of the condenser 18 is dependent upon the counter-voltage and the time relay before operation of the relay 28 is therefore a function of the counter-voltage.

The operation of the circuit of Fig. 1 may be more clearly understood from the following mathematical analysis:

If $q_1$ is the quantity of charge on the condenser 18 at any time $t$ seconds after the switches 9 and 19 are closed, and $q_2$ is the quantity of charge on the condenser 24 at any time $t$ seconds after the switches 9 and 19 are closed, then the current through the resistor 22 is given by $$i = \frac{dq_1}{dt} + \frac{dq_2}{dt} \qquad (1)$$

Because the condensers 18 and 24 are connected in series, the rate of change of potential on the condensers 18 and 24 must be equal. This may be expressed by the identity:

$$\frac{1}{C_1}\frac{dq_1}{dt} = \frac{1}{C_2}\frac{dq_2}{dt} \qquad (2)$$

where $C_1$ = the capacity of the condenser 18, and
$C_2$ = the capacity of the condenser 24.

By Kirchoff's law, $$Ri + V_1 = V_3 \qquad (3)$$
$$Ri + V_2 = V_0 \qquad (4)$$

where $R$ = the resistance of the resistor 22,
$i$ = the current through the resistor 22,
$V_0$ = the voltage between the conductors 6 and 8,
$V_1$ = the voltage across the condenser 18,
$V_2$ = the voltage across the condenser 24, and
$V_3$ = the average voltage drop across the resistors 14 and 16.

By substituting Equation 1 in Equations 3 and 4 the following relationships are obtained:

$$R\left(\frac{dq_1}{dt} + \frac{dq_2}{dt}\right) + \frac{q_1}{C_1} = V_3 \qquad (5)$$

and $$R\left(\frac{dq_1}{dt} + \frac{dq_2}{dt}\right) + \frac{q_2}{C_2} = V_0 \qquad (6)$$

After integrating and solving Equations 5 and 6, the following equations are obtained:

$$i = \frac{C_1 V_3 + C_2 V_0}{R(C_1 + C_2)} e^{-\frac{t}{R(C_1 + C_2)}} \qquad (7)$$

$$V_0 - V_2 = Ri = \frac{C_1 V_3 + C_2 V_0}{C_1 + C_2} e^{-\frac{t}{R(C_1 + C_2)}} \qquad (8)$$

Equation 8 may be written $$\frac{V_0 - V_2}{\frac{V_0 C_2 + V_3 C_1}{C_1 + C_2}} = e^{-\frac{t}{R(C_1 + C_2)}} \qquad (9)$$

From Equation 7 it is seen that an increase in the average voltage drop $V_3$ across the accelerating resistors 14 and 16 causes an increase in the time $t$ required for the current $i$ to decrease to a predetermined value after the switch 19 is closed, other circuit values remaining constant. The decrease in the current $i$ is accompanied by a corresponding increase in the voltage across the condenser 24. Also, a decrease in the average value of the voltage drop $V_3$ causes a decrease in the time $t$ for the current $i$ to decrease to a predetermined value.

Figure 8:
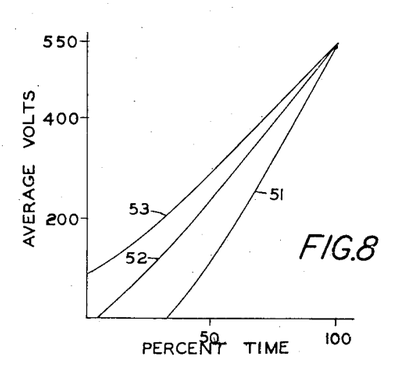
Fig. 8 is a graph showing exemplary relationships between the time interval and motor current obtainable by the present invention with different ratios of condenser capacity.

By altering the ratio of the capacities of the condensers 18 and 24 the degree of change in time for various values of the average voltage drop $V_3$ can be adjusted over a wide range. This is illustrated by the curves of Fig. 8. In Fig. 8 the ordinate is the average voltage drop $V_3$ across the resistors 14 and 16, and the abscissa is the percentage of time interval obtained, 100% time being considered as obtained when the average value of the voltage drop $V_3$ is equal to 550 volts. The curve 51 indicates the range of time when the ratio of the capacity of the condenser 18 to that of the condenser 24 is equal to 0.25, curve 52 indicates the range of time when this ratio is 0.375, and curve 53 is for a ratio of 0.5.

The curves of Fig. 8 show that in the present invention there is substantially a straight line ratio between the time interval required to charge the condenser 24 to the breakdown voltage of the discharge device 26 and the voltage drop $V_3$ across the starting resistors 14 and 16. If the load on the motor 11 is large, the amount of current through the resistors 14 and 16 is large, the average value of the voltage drop $V_3$ is consequently large, and the time before operation of the relay 28 is longer than if the load were small. Since the average voltage drop $V_3$ across the resistors 14 and 16 is directly proportional to the motor load, a suitable selection of the ratio of condenser capacities results in the time intervals being directly proportional to the motor load. Since the motor load is inversely proportional to the counter-voltage of the motor at any time during acceleration, the time intervals are inversely proportional to the average value of the counter-voltage during the time interval.

It is obvious from the preceding discussion that even though the motor 11 is stalled and does not accelerate, that the condenser 24 charges nevertheless and effects operation of the relay 28 after a time interval directly related to the current taken by the stalled motor. This feature makes possible so-called forced acceleration which is necessary in certain motor applications.

If the condenser 18 and its connections were not in the circuit of Fig. 1, the equation for the time required to charge the condenser 24 sufficiently for it to discharge through the device 26 is given by $$\frac{V_0 - V_2}{V_0} = e^{-\frac{t}{RC_2}} \quad (10)$$

Equation 10 may be written $$t = RC_2 \log_e \frac{V_0}{V_0 - V_2} \quad (11)$$

Equation 9 may be written $$t = R(C_1 + C_2) \log_e \frac{V_0 C_2 + V_3 C_1}{(V_0 - V_2)(C_1 + C_2)} \quad (12)$$

By comparing Equations 11 and 12 it is seen that the connection of the condenser 18 between the junction points 21 and 23 modifies the time interval directly with the average magnitude of the voltage drop $V_3$ across the starting resistors 14 and 16 during the time interval.

Figure 9:
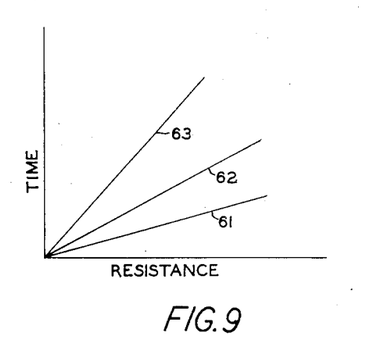
Fig. 9 is a graph showing the effect of varying the timing resistor for different values of condenser capacity.

Further adjustability of the new timing control circuit is illustrated by the graph of Fig. 9. In Fig. 9 the abscissa is the value of the resistance 22 in series with the switch 19 and the ordinate is the time interval between closure of the switch 19 and operation of the relay 28. The curve 61 is obtained when the capacities of the condensers 18 and 24 are relatively small, curve 62 is obtained when the capacities are double those of curve 61, and curve 63 is obtained when the capacities are three times those of curve 61. Each of curves 61, 62 and 63 is for a particular average value of the voltage drop across the resistors 14 and 16 and in each case the ratio of the capacity of the condenser 18 to that of the condenser 24 is 1 to 1.5.

It is a well-known fact that the average value of the voltage drop across the acceleration resistor in a direct current motor circuit during the interval between the first application of power and the occurrence of stable conditions or during the interval between the short circuiting of one section of the resistor and the occurrence of stable conditions is directly proportional to the load on the motor. Due to the fact that the curves 51, 52, and 53 of Fig. 8 are substantially straight lines shows that the time delay obtained by the new timing control circuit is substantially directly proportional to the voltage drop across the accelerating resistor and consequently is substantially directly proportional to the motor load. The curves 61, 62 and 63 of Fig. 9 show that variations in condenser capacity once a definite ratio is selected do not affect this direct relationship and that the straight line ratio is obtained regardless of the adjustment of the resistor 22.

Figure 2:
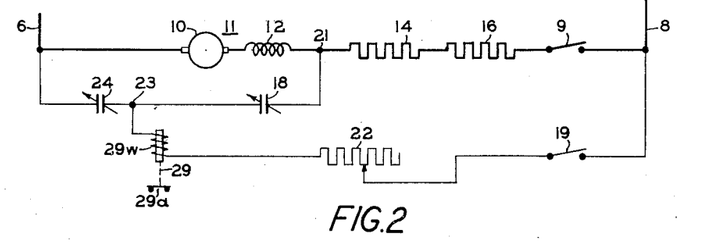
Fig. 2 is a simplified wiring diagram illustrating a modified form of timing control circuit and connected with a direct current motor in the manner of Fig. 1.

In Fig. 2 the relay 28 and the gaseous discharge device 26 of Fig. 1 are replaced by a relay 29 having normally-closed contacts 29a and an operating winding 29w. The winding 29w is connected in series with the resistor 22 between the resistor 22 and the junction point 23. When the switches 9 and 19 are first closed, the condenser charging current flowing from the conductor 8 through the resistor 22 causes immediate energization of the winding 29w and consequent operation of the relay 29. The relay 29 drops to its normal position when the charging current flowing through its winding 29w to the condensers 18 and 24 is reduced to a predetermined value due to change in potential on the condensers 18 and 24. The charging current through the winding 29w is inversely related to the potential across the condenser 24 and therefore the drop out of the relay 29 is controlled by the amount of charge on the condenser 24 as is the operation of the relay 28 of Fig. 1. The operation of the relay 29 is reversed from that of the relay 28 and consequently to incorporate it in a motor control circuit requires that its contacts 29a be normally closed instead of normally open as is the case with the control contacts 28b and 28c of the relay 28.

Figure 3:
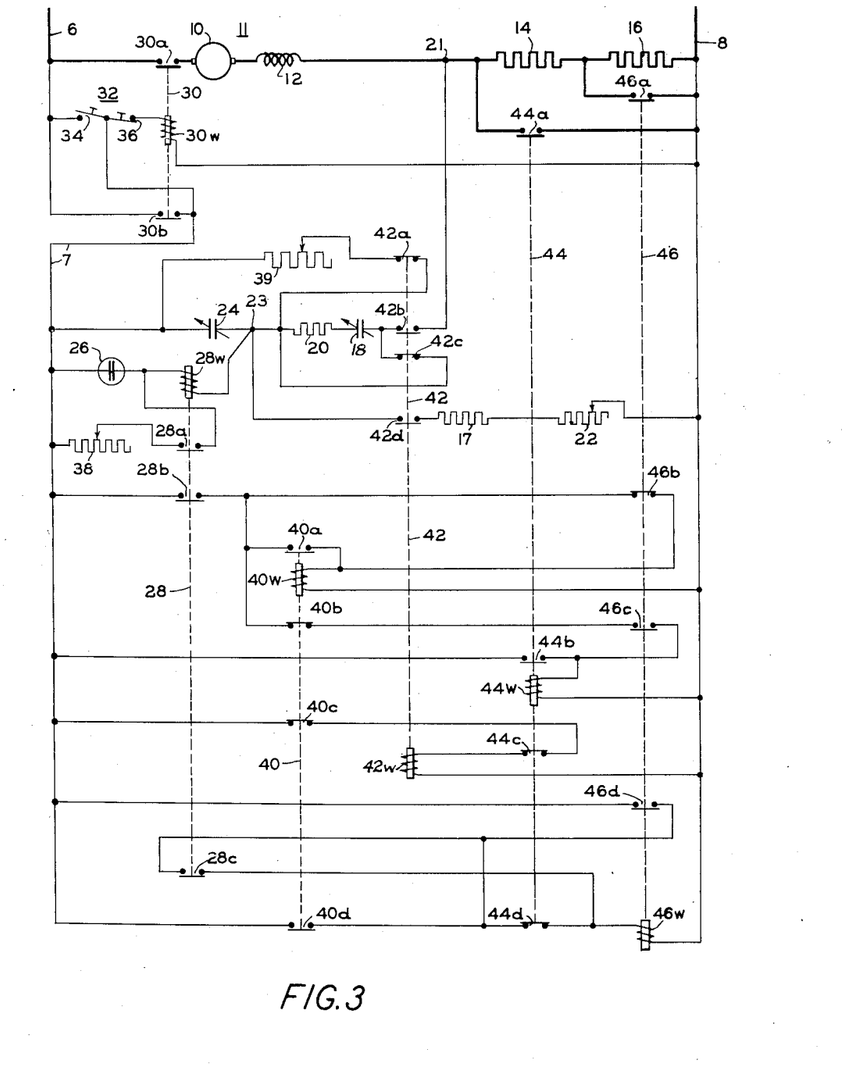
Fig. 3 is a complete wiring diagram of a direct current motor controller using the timing control circuit and connections of Fig. 1, and connected to a motor.

In Fig. 3 the armature 10 and the field 12 of the motor 11 are arranged to be connected in series with the resistors 14 and 16 between the conductors 6 and 8 through the contacts 30a of an electro-responsive switch 30 having an operating winding 30w and normally-open auxiliary contacts 30b. The energization of the winding 30w is controlled by a push button 32 having normally-open contacts 34 and normally-closed contacts 36. One terminal of the condenser 18 is arranged to be connected to the junction point 21, between the series field winding 12 and the accelerating resistor 16, through the contacts 42b of an electro-responsive relay 42 having an operating winding 42w and additional normally-open contacts 42d and normally-closed contacts 42a and 42c. The other terminal of the condenser 18 is connected through a resistor 20 of low ohmic value to one terminal of the condenser 24. The resistor 20 serves merely to limit the initial surge of the condenser charging current to protect the contacts 42b. The other terminal of the condenser 24 is connected to a conductor 7 which is arranged to be connected to the conductor 6 through the contacts 30b of the switch 30 or through the contacts 34 of the push button 32. The series connected discharge device 26 and the relay winding 28w are connected across the terminals of the condenser 24 from the conductor 7 to the junction point 23. The adjustable resistor 38 is connected in series with the contacts 28a across the discharge device 26 to form a discharge circuit for the condenser 24 through the winding 28w and consequently a temporary holding circuit for the relay 28. The normally-closed contacts 42a of the relay 42 complete another discharge circuit for the condenser 24 through an adjustable resistor 39. The normally-closed contacts 42c complete a discharge circuit for the condenser 18 through the resistor 20. The normally-open contacts 42d, when closed, connect the junction point 23, between the condenser 24 and the resistor 20, to the conductor 8 through a fixed resistor 17 and the adjustable resistor 22. The winding 42w of the relay 42 is arranged to be energized concurrently with the winding 30w of the switch 30, being connected between the conductors 7 and 8 through the normally closed contacts 40c of an electro-responsive relay 40 and the normally closed contacts 44c of an electro-responsive switch 44.

The accelerating resistor 16 is arranged to be short circuited by an electro-responsive switch 46 and the switch 44 is arranged to short circuit both of the accelerating resistors 14 and 16. The switch 44 has an operating winding 44w, normally-open contacts 44a and 44b and normally-closed contacts 44d in addition to the normally-closed contacts 44c. The switch 46 has an operating window 46w, normally-open contacts 46a, 46c and 46d and normally-closed contacts 46b. The contacts 46a when closed complete a shunt circuit around the resistor 16 and the contacts 44a when closed complete a shunt circuit around both of the resistors 14 and 16.

The relay 28, the operating winding 28w of which is in a discharge circuit of the condenser 24, has normally-open contacts 28a, 28b and 28c. The relay 40 has an operating winding 40w, normally-open contacts 40a and 40d, and normally-closed contacts 40b in addition to the normally-closed contacts 40c.

A more thorough understanding of the controller of Fig. 3 may be had from the following description of its operation. Assuming that the conductors 6 and 8 are connected to a suitable source of direct current (not shown), closure of the contacts 34 of the push button 32 effects concurrent energizations of the windings 30w and 42w. The contacts 30a close in response to energization of the winding 30w to connect the motor 11 between the conductors 6 and 8 through the resistors 14 and 16. The contacts 30b of the switch 30 close to form a holding circuit for the winding 30w through the stop contacts 36 independent of the opening of the contacts 34. Closure of the contacts 34 also completes a circuit from the conductor 6 to the conductor 7 and the closure of the contacts 30b maintains this circuit. The energizing circuit for the winding 30w is from the conductor 6 through the contacts 36 and the winding 30w to the conductor 8. The energizing circuit for the winding 42w of the relay 42 is from the conductor 7 through the normally-closed contacts 40c and 44c and the winding 42w to the conductor 8.

The relay 42 operates in response to the energization of its winding 42w to open its contacts 42a and 42c to interrupt the discharge circuits for the condensers 24 and 18, respectively, to close its contacts 42b to connect one terminal of the condenser 18 to the junction point 21, and to close its contacts 42d to connect the junction point 23 to the conductor 8 through the resistors 17 and 22. As a result of the closure of the contacts 42b and the interruption of the condenser discharge circuits, the condensers 18 and 24 immediately charge collectively to a voltage equal to the voltage drop across the motor 11, dividing the charge in the inverse ratio of their capacities.

Closure of the contacts 42d starts a gradual increase of the charge on the condenser 24 and a gradual decrease of the charge on the condenser 18 in the manner described in connection with Fig. 1. One circuit to the condenser 24 is from the conductor 7, through the condenser 24, the junction point 23, the contacts 42d, and the resistors 17 and 22 to the conductor 8, and another is from the junction point 23 through the condenser 18 to the junction point 21. When the voltage across the condenser 24 reaches a value equal to the breakdown voltage of the discharge device 26, the device 26 becomes conducting and the winding 28w is energized by the discharge current from the condenser 24 causing the relay 28 to operate and close its contacts 28a, 28b, and 28c. Closure of the contacts 28a of the relay 28 completes a further discharge circuit for the condenser 24 through the resistor 38 and the winding 28w, and closure of the contacts 28b completes an energizing circuit for the winding 40w through the normally-closed contacts 46b of the switch 46. Due to the presence of the resistor 38, the discharge current of the condenser 24 is limited and thus the winding 28w remains energized for a brief interval.

As a result of the energization of its winding 40w, the relay 40 operates to close its contacts 40a and 40d and to open its contacts 40b and 40c. Closure of the contacts 40a completes a holding circuit for the winding 40w around the contacts 46b. Opening of the contacts 40b prevents the completion of a circuit to the winding 44w through the contacts 46c, and opening of the contacts 40c causes deenergization of the winding 42w of the relay 42. Closure of the contacts 40d causes energization of the winding 46w of the switch 46 through the normally-closed contacts 44d of the switch 44.

As a result of the energization of the winding 46w, the switch 46 operates to close its contacts 46a, 46c, and 46d and to open its contacts 46b. Closure of the contacts 46a completes a shunt circuit around the accelerating resistor 16 resulting in an increase in the current flowing to the motor 11 and consequently resulting in an increased motor torque. The time interval between the closure of the contacts 30a of the switch 30 and the closure of the contacts 46a of the switch 46 is therefore measured by the timing control circuit including the condensers 24 and 18.

Closure of the contacts 46d completes two holding circuits for the winding 46w. One of these holding circuits is through the normally-closed contacts 44d of the switch 44 and the other is through the contacts 28c of the relay 28. Opening of the contacts 46b discontinues one circuit to the winding 46w but the winding 46w remains energized by virtue of the closure of the contacts 46a. Closure of the contacts 46c partially completes a circuit to the winding 44w, but this circuit is interrupted by the now open contacts 46b.

As a result of the deenergization of the winding 42w by opening of the contacts 46c, the contacts 42a and 42c of the relay 42 close to complete the discharge circuits for the condensers 24 and 18, respectively, through the resistors 39 and 20, respectively, and the contacts 42d and 42b open to disconnect the condensers 18 and 24 from the conductor 8 and the junction point 21, respectively.

The winding 28w is deenergized after a time interval depending upon the length of time required for the condenser 24 to lose its charge. This time interval need only be long enough for the switch 46 to operate. The relay 28 then returns to its normal position and opens its contacts 28b causing deenergization of the winding 46w and opens its contacts 28c to interrupt one circuit to the winding 46w, but the winding 46w remains energized through the normally-closed contacts 44d and the now closed contacts 46d.

Deenergization of the winding 46w permits the relay 46 to return to its normal position, and thereby to close its contacts 46c to again complete an energizing circuit for the winding 42w of the relay 42 through the contacts 44c. Opening of the contacts 46d interrupts another circuit to the winding 46w but the winding 46w remains energized through the contacts 46d and 44d.

Upon energization of the winding 42w, the relay 42 again operates to remove the short circuit connections from the condensers 18 and 24 and to connect them for charging in the same manner as before. After a time delay interval, depending upon the average voltage drop across the resistor 14, the discharge device 26 again breaks down to cause energization of the winding 28w and consequent operation of the relay 28. Closure of the contacts 28b completes an energizing circuit for the winding 44w of the switch 44 through the normally-closed contacts 46b and through the now closed contacts 46c. The relay 46 does not operate at this time because the circuit to its winding is interrupted by the now open contacts 46b. Closure of the contacts 28a completes the discharge circuit for the condenser 24 through the resistor 38, and closure of the contacts 28c completes an energizing circuit for the winding 46w which is independent of the contacts 44d.

As a result of the energization of its winding 44w, the switch 44 operates to close its contacts 44a and 44b and to open its contacts 44c and 44d. Closure of the contacts 44a short circuits the resistors 14 and 16 to connect the motor 11 directly across the supply conductors 6 and 8. Closure of the contacts 44b completes a holding circuit for the winding 44w directly across the conductors 7 and 8. Opening of the contacts 44c deenergizes the winding 42w, and opening of the contacts 44d discontinues one circuit to the winding 46w. When the condenser 24 is discharged, the winding 28w is deenergized and the consequent opening of the contacts 28c interrupts the remaining circuit to the winding 46w, which is thereupon deenergized, permitting the switch 46 to open.

Deenergization of the winding 42w permits the relay 42 to return to its normal position and complete the discharge circuits for the condensers 24 and 18 through the resistors 39 and 20 respectively.

The timing control circuit including the condensers 24 and 18 has provided a time interval between the operation of the switch 30 and the switch 46 and a further time interval between the operation of the switch 46 and the switch 44, each of which time intervals is directly dependent upon the average voltage drop across the accelerating resistance during the duration of the interval and is therefore directly related in extent upon the magnitude of the motor load. Since, for any given load on the motor 11, the voltage drop across the resistor 14 after operation of the switch 46 is less than the voltage drop across both resistors 14 and 16 before the switch 46 operates provided that the motor is accelerating, the time delay interval between the operation of the switches 46 and 44 is less than the time delay interval between the operation of the switches 30 and 46. That is, the successive time delay intervals for the same motor load are decrescent in extent as long as the motor is accelerating.

If at any time during the operation of the motor 11 it is desired to stop it, the push button 32 may be operated to open its contacts 36 resulting in deenergization of the winding 30w. The switch 30 consequently opens its contacts 30a to disconnect the motor 11 from the conductor 6 and opens its contacts 30b to interrupt the connection between the conductor 6 and the conductor 7 and thereby effects deenergization of any of the operating windings 40w, 42w, 44w, and 46w which may be energized. Deenergization of the relay 42w causes closure of the contacts 42a and 42c to effect complete discharge of the condensers 24 and 18, respectively, so that when the motor 11 is again restarted initial conditions are such as to give normal timing.

Figure 4:
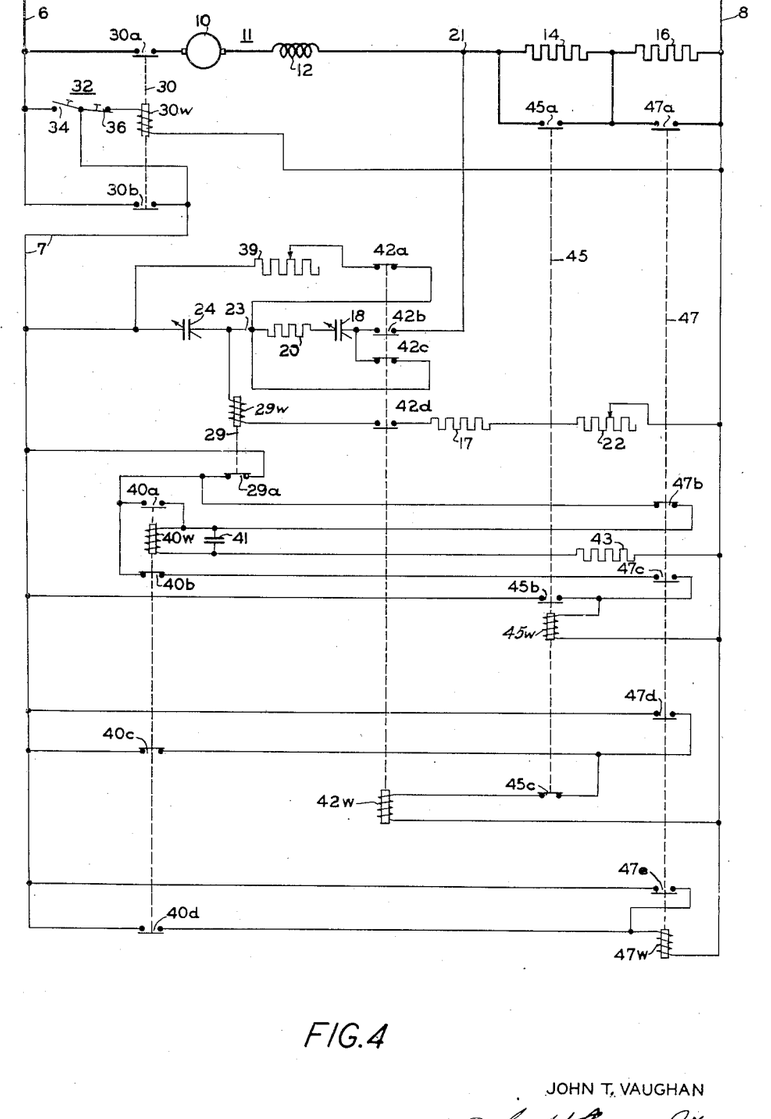
Fig. 4 is a complete wiring diagram of a direct current motor controller using the timing control circuit of Fig. 2, and connected to a motor.

A direct current motor controller similar to that of Fig. 3 but employing the series connected relay 28 of Fig. 2 is shown in Fig. 4. The controller of Fig. 4 utilizes an electro-responsive switch 47 having one more pair of normally-open contacts than the corresponding switch 46 of Fig. 3 and an electro-responsive switch 45 having one less pair of normally-closed contacts than the corresponding switch 44 of Fig. 3.

A condenser 41 is connected in parallel with the winding 40w of the relay 40 and a resistor 43 is connected in series with the winding 40w so that operation of the relay 40 is retarded upon energization of the winding 40w but any other suitable retardation means for the relay 40 may be used. In other respects the control elements of Fig. 4 are similar to those of Fig. 3, and any differences in their operation is fully explained in the following description of operation of the complete controller of Fig. 4.

Upon closure of the start contacts 34 of the push button 32 of Fig. 4, a circuit is completed from the conductor 6 through the winding 30w of the switch 30 to the conductor 8 and from the conductor 6 to the conductor 7. Assuming that the conductors 6 and 8 are connected to a suitable source of direct current (not shown), the switch 30 operates in response to energization of its winding 30w to close its contacts 30a and 30b. Closure of the contacts 30a connects the motor 11 between the conductors 6 and 8 in series with the resistors 14 and 16. Closure of the contacts 30b completes a holding circuit for the winding 30w around the start contacts 34 and through the stop contacts 36 of the push button 32. The conductor 7 is connected to the conductor 6 through the contacts 30b.

Concurrently with the energization of the winding 30w, the winding 42w of the relay 42 is energized over a circuit extending from the now energized conductor 7 through the normally closed contacts 40c and 45c to the conductor 8. Energization of the winding 42w causes the relay 42 to open its contacts 42a and 42c and to close its contacts 42b and 42d. Opening of the contacts 42a and 42c interrupts the discharge circuits for the condensers 24 and 18, respectively, through the resistors 39 and 20, respectively. The contacts 42b when closed connect the condensers 18 and 24 and the resistor 20 of low ohmic value across the motor 11 in series with each other. As a result, the condensers 18 and 24 charge immediately to a total voltage equal to the voltage drop across the motor 11, dividing the charge in the inverse ratio of their capacities. Closure of the contacts 42d connects the junction point 23 to the conductor 8 through the winding 29w of the relay 29 and the resistors 17 and 22. A condenser charging current immediately flows through the winding 29w causing operation of the relay 29 and a gradual increase in charge on the condenser 24. Concurrently, the condenser 18 begins to lose its charge. The charging rate of the condenser 24 is dependent upon the voltage drop across the resistors 14 and 16 due to the circuit relationships previously described, and after a lapse of time depending upon the average value of the voltage drop across the resistors 14 and 16, the current through the winding 29w is reduced to a value such as to permit the relay 29 to drop out.

The condenser 41 and the resistor 43 so delay the operation of the relay 40 that it does not have time to operate when the push button contacts 34 are closed before the contacts 29a of the relay 29 open. Drop-out of the relay 29 due to a decrease in the condenser charging circuit causes reclosure of the contacts 29a. Closure of the contacts 29a completes a circuit to the winding 40w through the normally-closed contacts 47b of the switch 47. In response to the energization of its winding 40w, the relay 40 operates to close its contacts 40a and 40d and to open its contacts 40b and 40c.

The opening of the contacts 40c causes deenergization of the winding 42w of the relay 42 which thereupon operates to open its contacts 42b and 42d to interrupt the condenser charging circuits and to close its contacts 42a and 42c to complete the discharge circuits for the condensers 24 and 18 respectively.

Closure of the contacts 40d completes an energizing circuit to the winding 47w of the switch 47 from the conductor 7 to the conductor 8. Opening of the contacts 40b prevents energization of the winding 45w upon closure of the contacts 47c. Closure of the contacts 40a completes a holding circuit for the winding 40w which is independent of the contacts 47b.

In response to energization of its operating winding 47w, the switch 47 operates to close its contacts 47a, 47c, 47d, and 47e and to open its contacts 47b. Closure of the contacts 47a completes a shunt circuit around the accelerating resistor 16 to cause an increase in the current flowing to the motor 11 and consequently an increase in motor torque. Closure of the contacts 47c does not complete a circuit at this time due to the fact that the contacts 40b are open. Closure of the contacts 47d completes an energizing circuit for the winding 42w of the relay 42 through the normally-closed contacts 45c of the switch 45 which is independent of the contacts 40c of the relay 40. Closure of the contacts 47e completes a holding circuit for the winding 47w directly across the conductors 7 and 8 which is independent of the contacts 40d.

The relay 42 operates in response to energization of its winding 42w to interrupt the discharge circuits for condensers 24 and 18 by opening its contacts 42a and 42c, respectively, and to close its contacts 42b and 42d. The winding 29w of the relay 29 is again energized by the condenser charging current upon closure of the contacts 42b and 42d. Energization of the winding 29w causes the relay 29 to open its contacts 29a causing deenergization of the operating winding 40w. Reclosure of the contacts 40b as a result of deenergization of the winding 40w does not complete a circuit to the winding 45w at this time because the contacts 29a are open. Closure of the contacts 40c does not effect any circuit changes at this time because the contacts 47d in parallel therewith are closed and, likewise, opening of the contacts 40d has no operative effect because the contacts 47e in parallel therewith are closed.

After a time interval directly dependent upon the load on the motor 11, the relay 29 is deenergized and again closes its contacts 29a. Closure of the contacts 29a completes an energizing circuit for the winding 45w through the normally-closed contacts 40b and the now closed contacts 47c. The switch 45 thereupon operates and as a result closes its contacts 45a and 45b and opens its contacts 45c. Closure of the contacts 45a shunts the resistor 14 to connect the motor 11 directly across the conductors 6 and 8. Closure of the contacts 45b completes a holding circuit for the winding 45w directly across the conductors 7 and 8. Opening of the contacts 45c deenergizes the winding 42w causing the relay 42 to again complete through the contacts 42a and 42c the discharge circuits for the condensers 24 and 18, respectively.

Opening of the contacts 36 of the push button at any time during operation of the motor 11 discontinues the energization of the winding 30w, and the contacts 30a consequently open to disconnect the motor from the conductor 6 and the contacts 30b open to disconnect the conductor 7 from the conductor 6 thereby deenergizing any of windings 40w, 42w, 45w, or 47w that may be energized.

In the controllers of Figs. 3 and 4 the average value of the voltage drop across the resistors 14 and 16 on the first step is higher than the average voltage drop across the resistor 14 on the second step if the motor is accelerating. As a result, in controllers having two or more steps of acceleration, the time interval of each succeeding step is shorter than that of the preceding step as long as the motor is accelerating. Shortening of the time interval of successive steps of acceleration is desirable in the acceleration of direct current motors driving a constant torque load if the peak currents during acceleration must be kept substantially constant.

Figure 6:
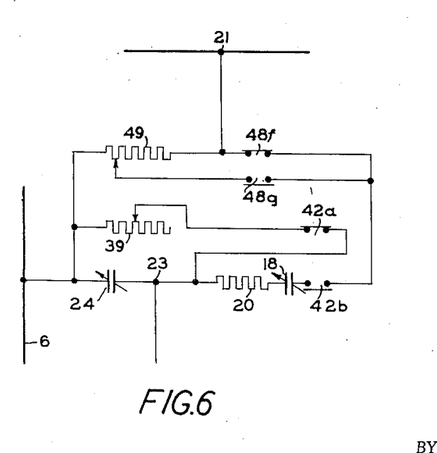
Fig. 6 is a fragmentary simplified wiring diagram illustrating the invention in connection with a modification of the controllers of Figs. 3 and 4.
Figure 7:
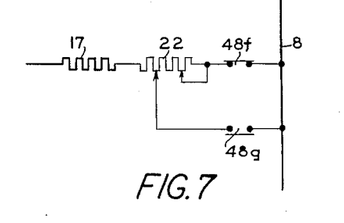
Fig. 7 is a fragmentary simplified wiring diagram illustrating the invention in connection with another modification of the controllers of Figs. 3 and 4.

In cases where this foreshortening of the acceleration steps is not desired, the circuit of Fig. 6 or of Fig. 7 may be incorporated in the controllers of Figs. 3 and 4. In Fig. 6 an adjustable resistor 49 is provided which may be connected between the contacts 42b and the junction point 21 when the contacts 48f are open and the contacts 48g are closed. When the connection of Fig. 6 is employed in either of the controllers of Figs. 3 or 4, the first timing interval begins when a circuit is completed from the condenser 18 to the junction point 21 through the contacts 42b of the relay 42 and the normally-closed contacts 48f. The contacts 48f may be normally-closed auxiliary contacts on either the switch 46 or 47 of Figs. 3 or 4. The contacts 48g may be normally-open contacts on either the switch 46 or 47. The second timing interval begins after the switches 46 or 47 have operated so that the contacts 48f are open and the contacts 48g are closed. The voltage drop across the resistor 49 which is connected in series between the condenser 18 and the junction point 21 when the contacts 48g are closed, causes a smaller condenser charging current to flow in the circuit including the condenser 18 and the timing interval on the second step therefore can be made as long or longer than the first timing interval by adjusting the value of the resistor 49.

If the circuit of Fig. 7 is included in the controller of Figs. 3 or 4, a like operation to that obtained by the use of the connection of Fig. 6 is accomplished by automatically varying the adjustment of the timing resistor 22 by the auxiliary contacts 48f and 48g in an obvious manner.

Figure 5:
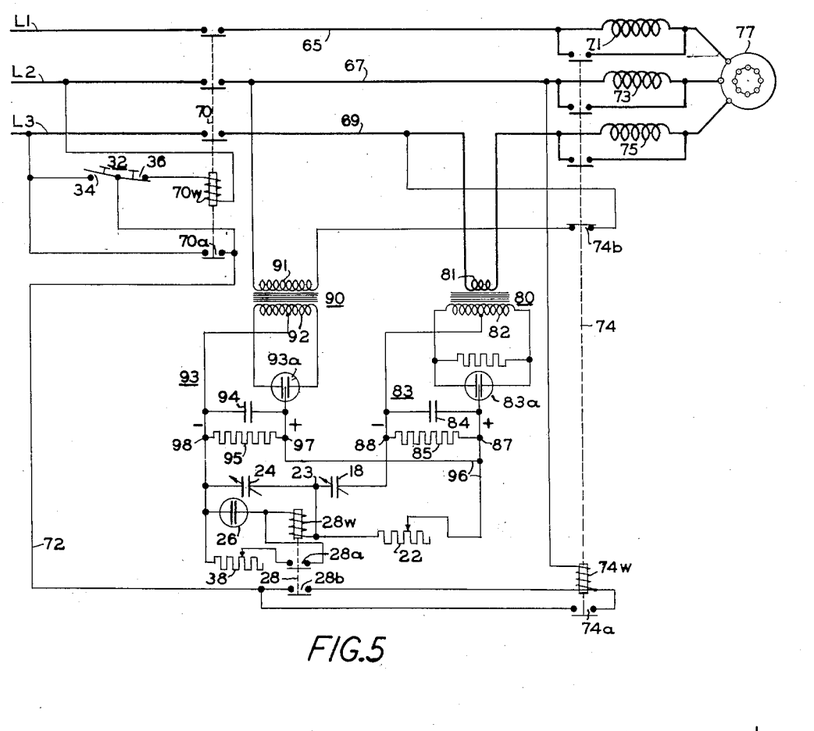
Fig. 5 is a simplified wiring diagram illustrating the timing control circuit connected to an alternating current motor for controlling the same.

In Fig. 5 is illustrated one way in which the timing control circuit of this invention may be connected for controlling an alternating current motor. An alternating current motor 77 is arranged to be connected to a source of three phase power indicated by the conductors $L_1$, $L_2$, and $L_3$ by means of an electro-responsive switch 70 through the conductors 65, 67, and 69. Interposed in the conductors 65, 67 and 69 are accelerating impedances 71, 73, and 75, respectively. An electro-responsive switch 74 is arranged to have its main contacts short circuit the impedances 71, 73 and 75 when its operating winding 74w is energized. The switch 74 has normally-open auxiliary contacts 74a and normally-closed auxiliary contacts 74b, and the switch 70 has an operating winding 70w and normally-open auxiliary contacts 70a.

The motor 77 is illustrated as a squirrel cage induction motor having accelerating impedance in its primary circuit, but applications of the timing control circuit to other types of alternating current motors controlled by varying either primary or secondary impedance is obvious from Fig. 5 and are not specifically described.

The switch 70 corresponds to the switch 30 of Figs. 3 and 4 and its winding 70w is arranged to be energized from the contactors $L_2$ and $L_3$ when the contacts 34 of the push button 32 are closed. Energization of the winding 70w effects closure of the main contacts of the switch 70 to energize the conductors 65, 67, and 69 and effects closure of the auxiliary contacts 70a to complete a holding circuit for the winding 70w through the normally-closed contacts 36 of the push button 32. Closure of the contacts 34 or the contacts 70a also partially completes a circuit from the conductor $L_3$, through the conductor 72, the normally-open contacts 28b of the relay 28, and the winding 74w to the conductor 67, but this latter circuit is interrupted by the normally-open contacts 28b of the relay 28. The timing control circuit of Fig. 1 including the relay 28 is shown in Fig. 5, but the modified timing control circuit of Fig. 2 can be employed as well and its cooperation with an alternating current motor is apparent from the description of Fig. 5.

A constant unidirectional voltage, corresponding to the voltage of the source in the case of direct current motor control, is applied to the timing control circuit and is obtained from a potential transformer 90 having its primary winding 91 connected across the conductors 67 and 69 through the normally-closed contacts 74b and its secondary winding 92 connected to a full wave rectifier circuit 93 including the rectifying device 93a and the filter condenser 94. The output of the secondary winding 92 of the transformer 90 is rectified by the rectifier circuit 93 in the usual manner and the rectified output voltage of the transformer 90 is applied across a resistor 95 with the polarity as indicated. A circuit is completed from the positive terminal 97 of the resistor 95 through a conductor 96, the adjustable resistor 22, the junction point 23, and the condenser 24 to the negative terminal 98 of the resistor 95. If this connection alone were present the condenser 24 would charge, after closure of the switch 70, in a predetermined interval of time depending upon the potential between the conductors 67 and 69, and upon reaching a predetermined charge would discharge through the discharge device 26 and relay winding 28w to operate the relay 28, which would effect operation of the switch 74. As long as the voltage between the conductors 67 and 69 remained constant, this time interval would also be constant, and no time current effect would occur.

To cause the time interval to vary in direct relationship to the load on the motor 77, a current transformer 80 having its primary winding 81 connected in series with the conductor 69 and its secondary winding 82 connected to a full-wave rectifier circuit 83 including the rectifying device 83a and the filter condenser 84 is provided. The output of the transformer 80 is rectified by the rectifier circuit 83 in the usual manner, and the rectified output of the transformer 80 is supplied to a resistor 85 with polarities as indicated. The negative terminal 88 of the resistor 85 is connected to one terminal of the condenser 18 and the positive terminal 87 of the resistor 85 is connected to the conductor 96. The other terminal of the condenser 18 is connected through the junction point 23 to one terminal of the condenser 24 as in Fig. 1.

Since the amount of current flowing to the motor 77 is directly related to the motor load, and since the unidirectional voltage output of the rectifier circuit 83 is directly proportional to the motor current, the voltage across the resistor 85 corresponds to the voltage drop across the resistors 14 and 16 in the case of the direct current motor of Fig. 1. The voltage drop across the resistor 95 and the voltage drop across the resistor 85 respectively are applied to the condensers 18 and 24 in the same manner as the voltage of the source and the voltage drop across the resistors 14 and 16 in Fig. 1, except that in Fig. 5 the condensers 18 and 24 do not receive the small initial charge. As a result the time required for the condenser 24 of Fig. 5 to reach a predetermined charge is directly proportional to the amount of current flowing to the motor and to the load on the motor as is the case in Fig. 1.

Upon expiration of the time delay interval required to charge the condenser 24, the condenser 24 discharges through the device 26 and the winding 28w causing operation of the relay 28 and consequent closure of the contacts 28a and 28b. Closure of the contacts 28b completes the previously traced circuit to the winding 74w and as a result of the energization of the winding 74w, the switch 74 operates to short circuit the impedances 71, 73, and 75, to close its auxiliary contacts 74a, and to open its auxiliary contacts 74b. Current from the source L1 and L2 and L3 may now flow directly to the motor 77 undiminished by accelerating impedance. The closure of the auxiliary contacts 74a completes an obvious holding circuit for the winding 74w independent of the opening of the contacts 28b. The contacts 28b open as soon as the discharge current of the condenser 24 flowing through the winding 28w, the contacts 28a, and the adjustable resistor 38 has decreased to the drop out value of the relay 28.

Opening of the auxiliary contacts 74b disconnects the primary winding 91 from the conductors 69 so that the timing control circuit remains unenergized during normal operation of the motor 77.

I claim:

1. A motor and control system combination, comprising a direct current motor, an accelerating resistor connected in series therewith, a pair of condensers connected in series with each other and across the motor armature, whereby the condensers are collectively charged to a voltage equal to the voltage drop across the motor in inverse proportion to their respective capacities when the motor and accelerating resistor are connected across a source of power, an electrical connection between the common terminal of the condensers and a point on the accelerating resistor which is remote from the common terminal of the motor and accelerating resistor, a timing resistor interposed in said connection, whereby upon operation of the motor one condenser begins to increase its charge and the other condenser begins to decrease its charge at rates dependent upon the electrical condition of the motor, and means operable in response to an accumulated charge on at least one of said condensers for controlling the motor.

2. A control system for controlling the control means of the known combination of an alternating current motor and control means for the motor, said system comprising a current responsive means adapted to produce a unidirectional voltage directly related to the amount of current flowing to the motor, means adapted to produce a substantially constant unidirectional voltage, a potential absorbing device, electrical connections between a portion of said device and said constant voltage producing means for subjecting said portion of said device to said substantially constant unidirectional voltage, electrical connections between another portion of said device and said current responsive means for simultaneously subjecting said last named portion of said device to said varying unidirectional voltage, a timing resistor included in said connections, said portions of said device being connected in series with each other, whereby when charges are produced by said voltages on the portions, respectively, the rates of accumulation of potential by the portions are mutually affected in a manner such that the time required to accumulate a predetermined potential on at least one of said portions of the device is directly related to the sum of said voltages, and means rendered operative in response to the accumulation of said predetermined potential for controlling the control means.

3. A motor and control system combination, comprising an electric motor, an accelerating resistor, means connecting said motor and said resistor in series across a source of direct current power, a pair of condensers connected in series with each other across the motor armature, means responsive to a predetermined potential across at least one of said condensers for controlling the current flowing to said motor, a resistance means, and means electrically connecting one of said condensers across said source in series with said resitsance means, whereby said condensers are subject to a charging potential dependent upon the counter-electro-motive force of the motor when the motor is rotating and to a substantially constant potential when the motor is not rotating.

4. The combination with a motor and control system comprising a direct current motor and an accelerating resistance connected in series, means adapted to connect said series connection across a source of power, shunting means including a capacitive time delay device operative when the device is charged to a predetermined value to shunt a portion of the accelerating resistance while the motor is accelerating, whereby the voltage drop across said resistance is reduced, and thereafter to shunt successively and cumulatively additional portions of said accelerating resistance, of a second capacitive device operatively associating the first capacitive device with said resistance to cause said first capacitive device to charge at a rate inversely proportional to the voltage drop across said resistance, whereby said shunting operations take place after time intervals respectively, each of which intervals is substantially directly proportional in extent to the average value of the voltage drop across the resistance throughout its own duration.

5. A motor and control system combination, comprising a direct current motor, an accelerating impedance, switch means operable to vary the effective value of said impedance in steps, and timing means operable after time delay intervals substantially directly proportional to the current flowing to the motor during the respective intervals for causing operation of said switch means after each interval, said timing means being responsive to the change in value of said impedance upon successive operations of said switch means for causing successive time delay intervals to be decrescent in extent.

6. In a motor acceleration system wherein a capacitive charge absorbing device operates as an arresting means to arrest the action of an accelerating control means for a predetermined period and is connected in series with a timing resistor to a source of substantially constant voltage for charging thereby and wherein said accelerating control means is arranged to control the effective resistance of an accelerating resistor connected in series with a direct current motor, the combination with said charge absorbing device of a second capacitive charge absorbing device electrically interconnecting the common terminal of said first charge absorbing device and said timing resistor with the common terminal of said motor and said accelerating resistor, whereby the charging time of the first charge absorbing device is modified so as to depend upon the ratio of the electrostatic capacities of the two charge absorbing devices, the electrical condition of the motor during the charging interval, and the magnitude of the substantially constant voltage.

7. The combination with a motor and a control system combination, comprising a direct current motor, a condenser means, electrical connections between the condenser means and said motor operable for charging the condenser means at a rate inversely related to the load on the motor, whereby the charging current of the condenser means decreases to a predetermined value in a time interval directly related in extent to the load on the motor, of means responsive to said predetermined value of the charging current of the condenser means for changing the condition of motor operation.

8. A motor and control system combination, comprising a direct current motor, an accelerating resistor connected in series therewith, a pair of series connected condensers, a timing resistor having one of its terminals connected to the common terminal of the condensers, means connecting the other terminals of the said condensers, respectively, to two of the motor terminals across which the voltage changes are related to changes in voltage in the motor armature for subjecting the condensers to the countervoltage of the motor, and means connecting the other terminal of the timing resistor to the accelerating resistor at a point remote from the point of connection of the accelerating resistor and the motor.

9. A controller for an electrical translating device, comprising a pair of condensers and a resistor connected in Y with respect to each other, means adapted to connect the outside terminals of one condenser and of the resistor across a source of substantially constant voltage, means adapted to connect the outside terminals of the second condenser and of the resistor across a source of voltage which varies in magnitude in accordance with an electrical condition of the translating device, whereby, when the Y-connected condensers and resistor are connected across said voltage sources, said condensers accumulate charges, respectively, at rates which are interdependent, and means responsive to the accumulated charge on at least one of said condensers for controlling said translating device.

10. A controller in accordance with claim 9 characterized further in that the capacities of the condensers are so related that the rate of charge accumulation on at least one of said condensers is inversely proportional to the magnitude of the variable voltage.

11. A motor and control system combination, comprising a direct current motor, an accelerating resistor connected in series therewith, switch means operable to vary the effective value of said resistor in steps, timing means, operative during rotation and non-rotation of the motor and after each of successive time delay intervals of which each is substantially directly proportional to the average voltage drop across said resistor throughout its own duration for causing operation of said switch means after each interval, and said timing means being responsive to the change in value of said resistor caused by operation of said switch means to cause said successive time delay intervals to be decrescent in extent.

12. A motor and control system combination, comprising a direct current motor, an accelerating resistor connected in series therewith, shunting means operable for shunting at least a portion of said resistor, means operatively associated with said shunting means for causing said shunting operation to take place after a time delay interval substantially directly proportional to the amount of current flowing to the motor during said interval when the motor is connected to a source of power, and said means including a capacitance electrically associated with said resistor and having a linear relationship between its charging time and the magnitude of the voltage drop across said resistor.

13. The combination with a plurality of successively operable electromagnetic accelerating switches for an electric motor, a condenser, a timing resistance, and connecting means for connecting said condenser and said timing resistance in series across a voltage source of a second condenser having one terminal connected to the common terminal of said first condenser and said timing resistance, additional connecting means for connecting the other terminal of the second condenser and the other terminal of said timing resistance to a voltage source, and means responsive to the electrical condition of at least one of said condensers for effecting operation of said switches after time delay intervals, whereby, when the first connecting means is connected across a source of substantially constant voltage and the additional connecting means is connected across a source of variable voltage having an average magnitude directly related to an electrical condition of the motor, said time delay intervals are directly related to the magnitude of the variable voltage or the electrical condition of the motor.

14. A combination in accordance with claim 13 characterized in that said first connecting means and additional connecting means are connected to said voltage sources, respectively, and the said average magnitude of the voltage of the source of variable voltage is substantially directly proportional to the current flowing to the motor.

15. A combination in accordance with claim 13 characterized in that the means responsive to the electrical condition of at least one of said condensers comprises an electromagnetic relay having its operating winding connected in parallel with at least one of said condensers.

16. A motor and control system combination, comprising a direct current motor, an accelerating resistance connected in series with said motor, switch means operable to vary the effective value of said resistance, a capacitive time delay means having a time delay period directly proportional to the average magnitude of a voltage applied across two of its terminals during said period, means connecting said two terminals of the time delay means across at least a portion of the accelerating resistance, said time delay means including means for effecting operation of said switching means at the expiration of said time delay period.

17. Apparatus for controlling the operation of an electric translating device, a pair of condensers and a resistor connected in Y with respect to each other, means connecting the outside terminals of one condenser and of the resistor across a source of substantially constant voltage, means connecting the outside terminals of the second condenser and of the resistor across a source of variable voltage which varies in magnitude in accordance with the electrical condition of the device to be controlled, whereby, when the Y-connected condensers and resistor are connected across said voltage sources, the voltage across each of said condensers increases toward a predetermined voltage, and means responsive to the attainment of said predetermined voltage by at least one of said condensers for controlling said device, the ratios of the capacities of said condensers to each other and of the magnitude of said predetermined voltage to the magnitude of said constant voltage being such as to cause the time for the said one condenser to reach said predetermined voltage to be substantially directly proportional to the magnitude of said variable voltage.

JOHN T. VAUGHAN.